(12) United States Patent
Donohue et al.

(10) Patent No.: US 8,341,613 B2
(45) Date of Patent: Dec. 25, 2012

(54) REDUCING STACK SPACE CONSUMPTION VIA HEAD-CALL OPTIMIZATION

(75) Inventors: Aran Donohue, North York (CA); Ian Richard Finlay, Uxbridge (CA)

(73) Assignee: International Business Machines Corporation, Armonk, NY (US)

( * ) Notice: Subject to any disclaimer, the term of this patent is extended or adjusted under 35 U.S.C. 154(b) by 1417 days.

(21) Appl. No.: 11/950,267

(22) Filed: Dec. 4, 2007

(65) Prior Publication Data

US 2009/0144709 A1    Jun. 4, 2009

(51) Int. Cl.
*G06F 9/45* (2006.01)
(52) U.S. Cl. .................. 717/155; 717/151
(58) Field of Classification Search .......... 717/151, 717/155
See application file for complete search history.

(56) References Cited

U.S. PATENT DOCUMENTS

| | | | |
|---|---|---|---|
| 5,946,492 A | 8/1999 | Bates | |
| 6,934,935 B1 * | 8/2005 | Bennett et al. | 717/127 |
| 2004/0210882 A1 * | 10/2004 | Takeuchi | 717/141 |
| 2006/0117302 A1 * | 6/2006 | Mercer et al. | 717/131 |
| 2006/0235920 A1 * | 10/2006 | Yu | 708/446 |
| 2007/0039008 A1 * | 2/2007 | Williamson et al. | 719/313 |

* cited by examiner

*Primary Examiner* — Li B Zhen
*Assistant Examiner* — Bradford Wheaton
(74) *Attorney, Agent, or Firm* — Patterson & Sheridan, LLP

(57) ABSTRACT

Embodiments of the invention provide a method for reducing stack space consumption via a head-call optimization. When compiling the source code of a computer application, a compiler application may be configured to analyze program flow to identify a "head-call" within any functions included in the program source code. Once identified, the "head-call" may be removed during program compilation. Doing so may reduce the number of elements pushed onto a program's stack space during program execution.

12 Claims, 5 Drawing Sheets

REDUCING STACK SPACE CONSUMPTION VIA HEAD-CALL OPTIMIZATION

BACKGROUND OF THE INVENTION

1. Field of the Invention

Embodiments of the present invention generally relate to a method for optimizing the compiling of computer programs. More particularly, embodiments of the invention relate to a head-call optimization technique used to reduce the amount of stack space consumed by a computer program.

2. Description of the Related Art

Compilers are computer programs that translate source code into object code. The source code is usually composed by developers using a high-level programming language, such as the C, C++ or Java® programming languages. The object code produced by the compiler is assembly or machine language. The object code generated by the compiler is output in the format of a binary executable file. Once compiled, the program is executable, i.e., a computer can load and execute the program.

Often, compilers use a multiple-pass process to generate an executable program from program source code. First, a lexical analysis pass is used to convert the source code into an intermediate representation, consisting of small elements referred to as tokens. Some compiler applications are configured to analyze this intermediate code, to determine how the program can be optimized. The optimized code is functionally equivalent, but may run more efficiently or consume less memory space. For example, dead code elimination is a type of optimization that reduces a program's size by removing unreachable code or unused variables. Once the intermediate language has been optimized, it is translated into executable code, i.e., a sequence of machine-level instructions executable by a particular processor architecture.

Memory consumption and stack usage is an aspect of program execution that may benefit from code optimization. When a new program is executed, a memory space is allocated for the program to use. Typically, a stack space is allocated at one end of the memory space and a heap space is allocated at the other end. During program execution, the space allocated for both the stack and the heap grow towards the center of the memory space. The stack is a reserved area that stores data using a "last in, first out" data structure. The stack stores program data related to program flow, such as the program counter and each called function's local variables. The computer uses this information to resume execution at the appropriate point of a function after program control is returned from one function to another. For example, if function A calls function B, then the computer stores ("pushes") function B data on the stack above the data for function A. If function B calls function C, then function C's data is also pushed on the stack. At this point, the stack contains data for functions A, B and C. Because the stack is a "last in, first out" data structure, the data for function C is on the "top" of the stack. Accordingly, when function C exits, function C's data is removed ("popped") from the top of the stack, and the program resumes executing at the point of function B where it left off when function C was called. Likewise, when function B exits, function B's data is popped from the stack, and the program resumes executing at the point of function A where it left off when function B was called.

SUMMARY OF THE INVENTION

Embodiments of the invention generally provide a method for reducing stack space consumption via head-call optimization. One embodiment of the invention includes a method for compiling program source code. The method may generally include receiving the program source code for a software application to be compiled, and during program compilation, performing a head-call optimization. The head-call optimization may generally include evaluating one or more function calls included in the program source code to identify whether a first operation of a first function call of the one or more function calls is to invoke a second function call of the one or more function calls and modifying a program flow of the computer program such that the second function call is invoked prior to an invocation of the first function call.

Another embodiment of the invention includes a computer-readable storage medium containing a compiler program, which, when executed performs an operation for compiling program source code. The operation may generally include receiving the program source code for a software application to be compiled, and during program compilation, performing a head-call optimization. The head-call optimization may generally include evaluating one or more function calls included in the program source code to identify whether a first operation of a first function call of the one or more function calls is to invoke a second function call the one or more function calls and modifying a program flow of the computer program such that the second function call is invoked prior to an invocation of the first function call.

Another embodiment of the invention includes a system having a processor and a memory containing a compiler program, which when executed by the processor, is configured to perform an operation for compiling program source code. The compiler program may be generally configured to receive the program source code for a software application to be compiled, and during program compilation, performing a head-call optimization. The head-call optimization may generally include evaluating one or more function calls included in the program source code to identify whether a first operation of a first function call of the one or more function calls is to invoke a second function call of the one or more function calls and modifying a program flow of the computer program such that the second function call is invoked prior to an invocation of the first function call.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
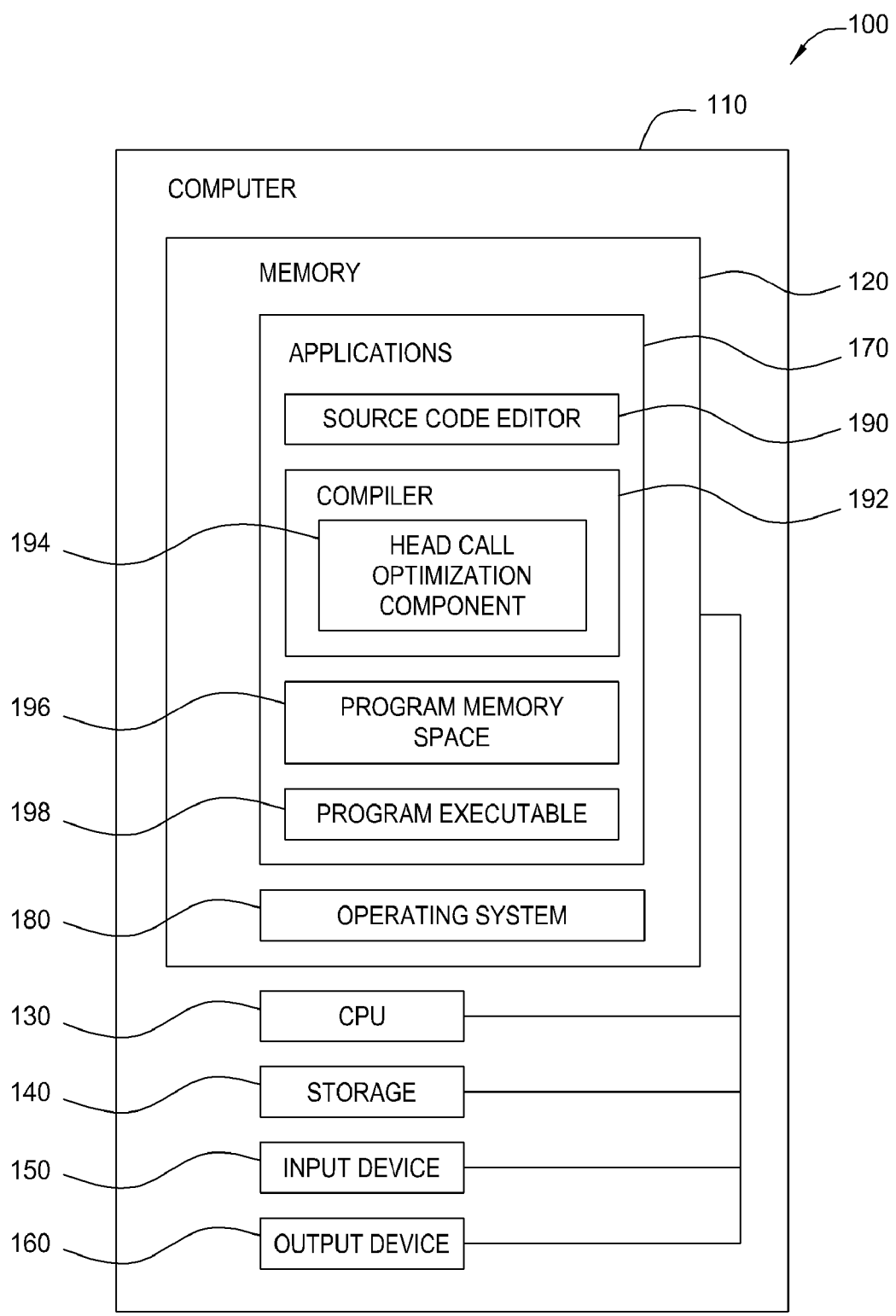
FIG. 1 is a block diagram illustrating components of a computer system with programming applications, according to one embodiment of the invention.

Embodiments of the invention provide a method for reducing stack space consumption via a head-call optimization. In one embodiment, a compiler may be configured to analyze program flow to identify a "head-call" within a function. Once identified, the "head-call" may be removed to reduce the number of elements pushed onto a program's stack space during program execution. As used herein, a "head-call" generally refers to a program flow scenario, where the first action of a function is to make a call to another function.

In such a scenario, the compiler may optimize out one of the function calls, thereby reducing stack space consumption during program execution. For example, the head-call optimization may be applied when function A calls function B, which in turn calls function C as its first operation. This pattern frequently occurs in program source code. For example, a common scenario that fits this pattern is where function B invokes an initialization routine prior to carrying out its "main" role. In such a case, the compiler may rewrite the call as though function A called function C directly, resulting in a savings of stack space otherwise allocated for function B during the execution of function C. So long as function C is not passed parameters only in scope to function B and does not return a value needed within function B, calling function C from within function A does not disrupt the operation of the program.

Eliminating these head-calls may be particularly useful for devices or systems with limited memory resources, such as cell phones or PDA, gaming consoles, and portable gaming devices, as well as in programs that might otherwise overflow the stack space. Manually writing source code without head-calls can be time-consuming and counter-intuitive. Moreover, the resulting source code may be difficult to understand or to debug or update.

Additionally, one skilled in the art of building compiler applications will recognize that embodiments of the invention may be combined with other compiler optimization techniques. For example, in one embodiment, the compiler may defer local variable initializations and usage that might occur before a call to a function that occurs early in a function, but does not pass such variables to the function. For example, assume that function B first initializes a local integer prior to calling function C and the integer variable is not passed as a parameter to function C. In such a case, the head-call optimization may still be applied to this pattern, deferring the initialization of the integer variable and having function A call function C directly, prior to calling function B, again reducing the need to push function B on the stack in order to execute function C. Another example includes splitting the stack allocations and initializations of local variables in a program that are needed by a function that occurs early in the program and that can be the target of head-call optimization. For example, assume that integer variables x and y are initialized at the beginning of function B before the call to C and y is used by C but not x, in such a case, the compiler may be configured to recognize this pattern and perform a head-call optimization by allowing A to place y on the stack, call C, and then allow B to proceed with the normal initialization of x.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating components of a computer system 100 with software programming applications, according to one embodiment of the invention. As shown, computer system 110 includes a central processing unit (CPU) 130 connected by a bus to memory 120, storage 140, input devices 150, and output devices 160. Computer 110 is typically running an operating system 180 configured to manage interaction between the computer hardware and the higher-level software applications 170 (e.g., a compiler application 192).

As is known, software developers may interact with a variety of applications to compose an executable computer program. Illustratively, e.g., FIG. 1 shows a source code editor 190 and the compiler 192 used by a developer to compose and compile software programs. The source code editor 190 allows the developer to write the software program in a particular programming language, such as the C, C++ or Java® programming languages. Once the program is written, the source code may be supplied to the compiler 192, which in turn is configured to compile the source code and to output a program executable 198 tailored for the architecture of a particular computing system (e.g., computing system 100). The resulting program executable 198 may then be executed on computer system 100.

Depending on the particular compiler 192, a number of optimizations may be made during the process of generating the program executable 198 from program source code. This process, called code optimization, may allow the program to consume less memory or run faster during program optimization then if compiled directly as written by the developer. In one embodiment, compiler 192 may be configured to perform a head-call optimization. Doing so allows the program executable 198 to reduce the use of memory allocated to program memory space 196 by using less stack space during program execution. Illustratively, the compiler 192 includes a head-call optimization component 194. In one embodiment, the head-call optimization component 194 may be configured to evaluate program source code or an intermediate representation thereof in order to identify elements of a program to which a head-call optimization may be applied.

The computer system 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances. Further, the software applications illustrated in FIG. 1 and described herein may be implemented using computer software applications executing on existing computer systems, e.g., desktop computers, server computers, laptop computers, tablet computers, cell phones, PDA's, and the like. However, the software applications described herein are not limited to any currently existing computing environment or programming language, and may be adapted to take advantage of new computing systems as they become available. Further, still one of ordinary skill in the art will recognize that the computer system 100 illustrated FIG. 1 is simplified to highlight the present invention.

Figure 2:
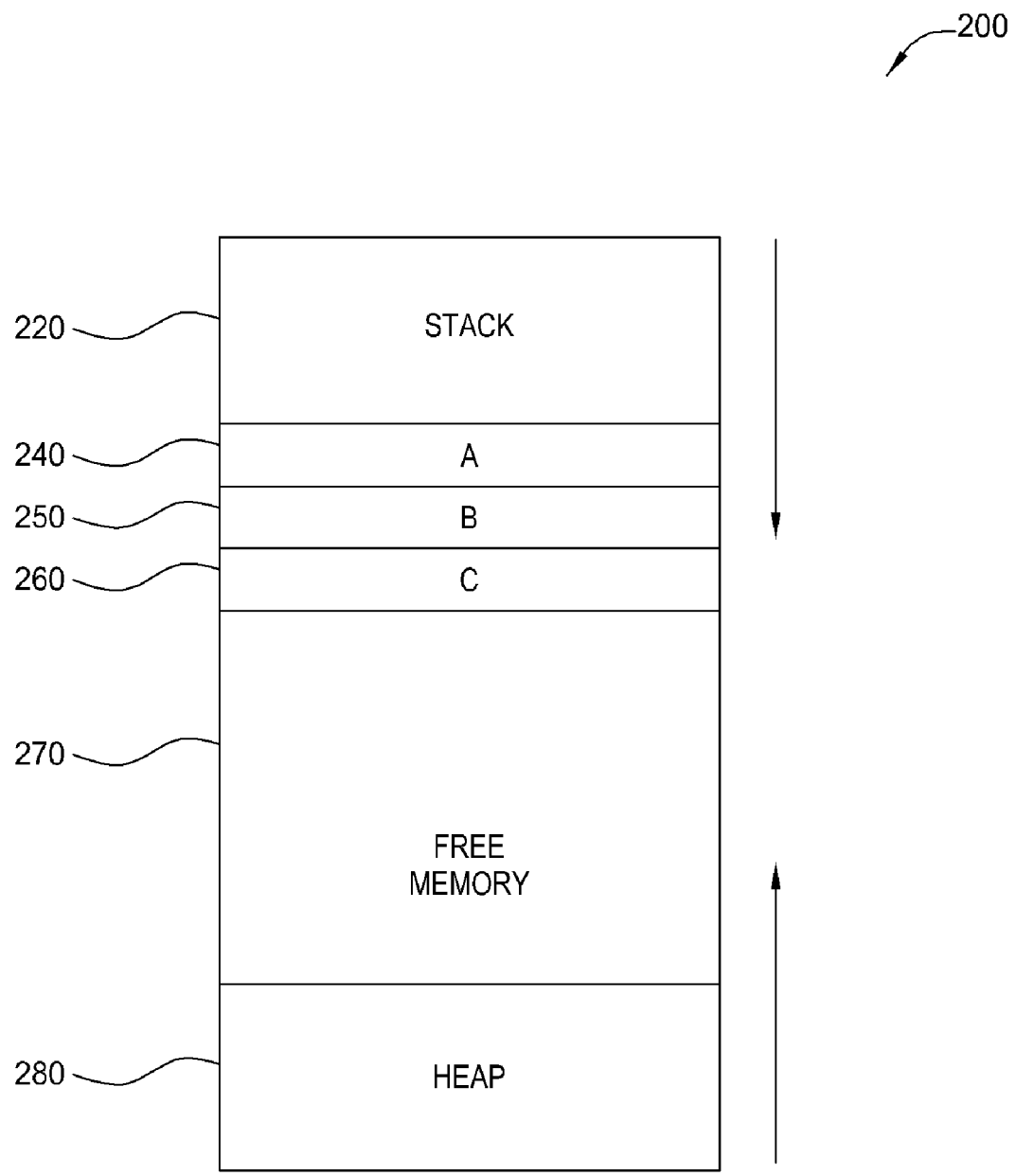
FIG. 2 is a block diagram illustrating components a program memory space, according to one embodiment of the invention.

FIG. 2 is a block diagram illustrating components a program memory space 200, according to one embodiment of the invention. As shown, the program memory space 200 includes a stack 220, a heap 280, and free memory space 270, which provides room for the stack 220 and the heap 280 to grow towards one another during program execution. As is known, heap 280 provides a persistent storage area for a program; memory allocated in the heap remains in existence for the duration of a program. Therefore, global variables (storage class external), and static variables are typically allocated on the heap. In contrast, memory allocated to stack 220 is used for local variables and data specific to a particular function. For example, if a function A is called, then data 240 associated with function A, such as the value of a program counter and local variables are pushed onto the stack 220. If function A then calls a function B, then data 250 related to function B is pushed on the stack "on top" of the data 240 for function A. Similarly, if function B calls another function C, then data 260 for function C is pushed on the stack "on top" of the data 250 and 240 for function B and function A. When function C returns, the program resumes execution of function B by popping function C's data 260 from the stack. Similarly, execution can resume in function A and by popping data 250 from the stack. Because the stack 220 includes information local to a given function, when popped of the stack, the memory used by that stack element is returned to free memory 270.

Figure 3:
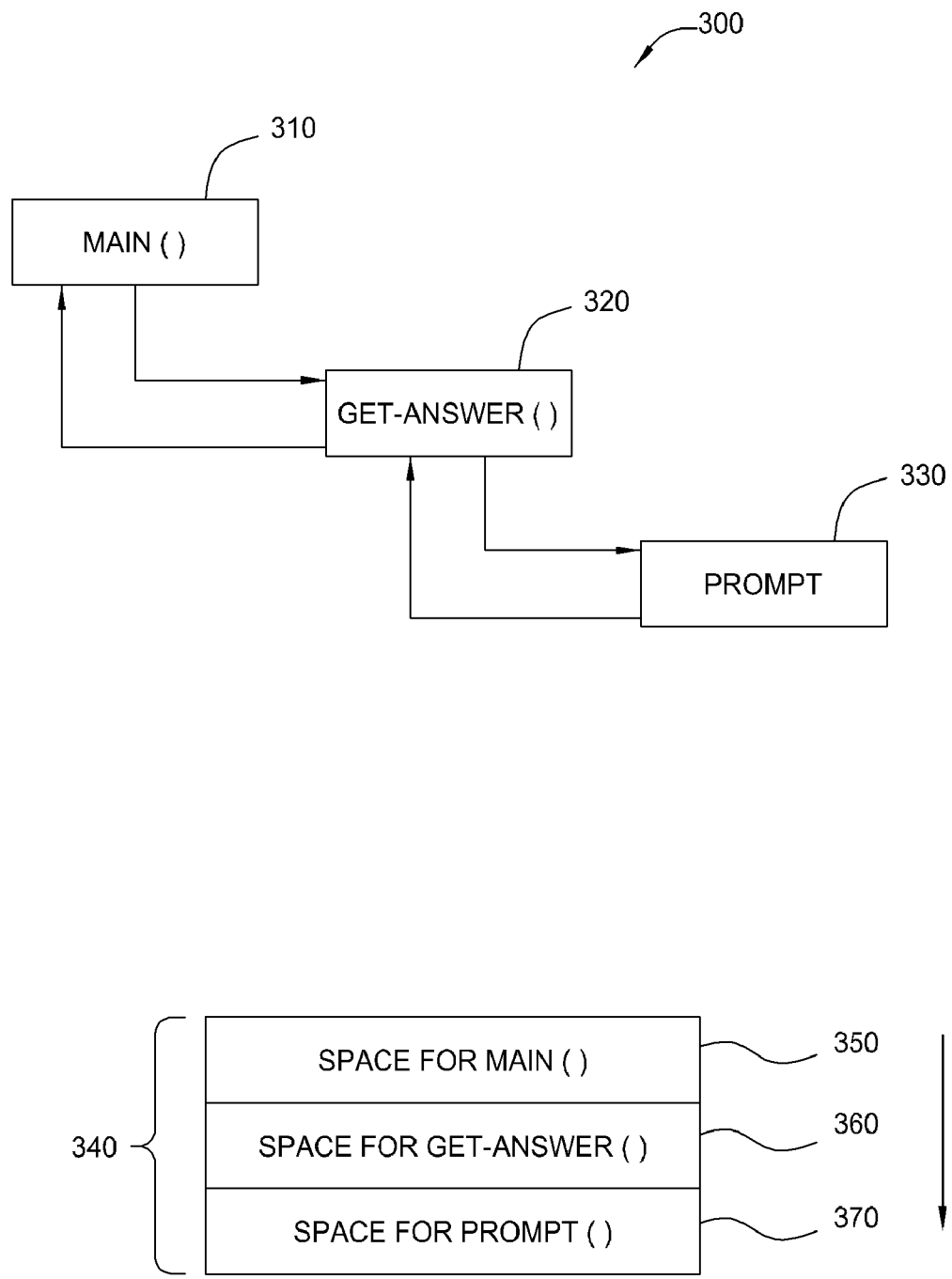
FIG. 3 is a block diagram illustrating how stack space may be allocated for program that includes nested functions calls, according to one embodiment of the invention.

FIG. 3 is an illustration of a program flow 300 and a corresponding stack space 340 allocated for program that includes nested function calls, according to one embodiment of the invention. A nested function call occurs when one function calls another function. An example of program source corresponding to the program flow depicted in FIG. 3 is shown in Table I below.

TABLE I

Example Program Before Head-call Optimization

| | |
|---|---|
| 01 | #define ENGLISH 0 |
| 02 | #define FRENCH 1 |
| 03 | int language; |
| 04 | int get_answer( ); |
| 05 | void prompt( ); |
| 06 | int get_answer( ) { |
| 07 |     prompt( ); |
| 08 |     int result; |
| 09 |     scanf("%d", &result); |
| 10 |     return result; |
| 11 | } |
| 12 | void prompt( ) { |
| 13 |     char * prompts[ ] = { |
| 14 |       "Give me a number!\n", |
| 15 |       "Numero s'il-vous-plait!\n" |
| 16 |     } |
| 17 |     printf("%s", prompts[language]); |
| 18 | } |
| 19 | int main(int argc, char * argv[ ]) { |
| 20 |     int answer; |
| 21 |     language = FRENCH; |
| 22 |     answer = get_answer( ); |
| 23 |     printf("The answer is %d.\n", answer); |
| 24 |     return 0; |
| 25 | } |

In this example, a main( ) function 310 (lines 17-25) calls a get_answer( ) function 320 at line 22. The get_answer( ) function 320 then calls a prompt( ) function 330 at line 7. The call to the prompt( ) function 330 is a head-call, because the get_answer( ) function 320 calls the "prompt( )" function 330 as the first line of code within the get_answer( ) function 320. Upon completion of the prompt( ) function 330, program execution returns to the get_answer( ) function 320. And upon completion of the get_answer( ) function 320, program execution returns to the main( ) function 310, until the program completes executing at line 24.

Illustratively, FIG. 3 also shows a representation of the stack space 340 that results from the program flow 300. As shown, stack space 340, grows down into the free memory allocated for program execution. Further, stack space 340 includes data 350 for the main( ) function, data 360 for the get_answer( ) function, and data 360 for the prompt( ) function. Note, in this example, due to the head-call to the prompt( ) function from within the get answer( ) function, the stack space 340 includes an entry for each of the main( ), get_answer( ), and prompt( ) functions. At the time the entry for the prompt( ) function is pushed onto the stack, however, the entry for get_ answer( ) function does not include any program variables, because the prompt( ) function in the first action performed by the get_answer( ) function. In one embodiment, a compiler application may be configured to perform a head-call optimization when compiling program source code, such as the source code in Table I. For example, the head-call to the prompt( ) function may be moved during compilation to be outside of the get_answer( ) function during program execution.

Figure 4:
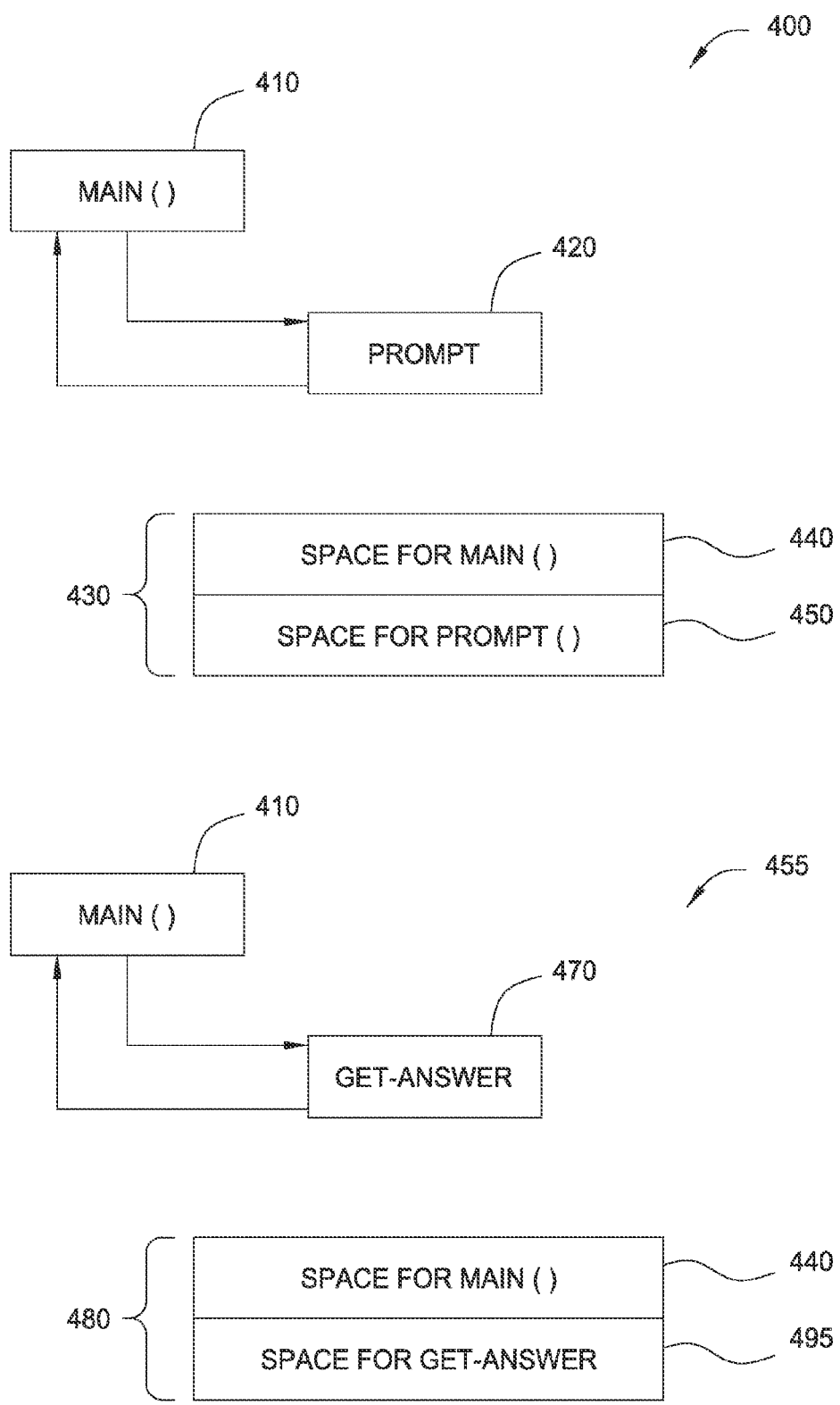
FIG. 4 is a block diagram illustrating how stack space may be allocated for a program compiled using a head-call optimization technique, according to one embodiment of the invention.

FIG. 4 is a block diagram illustrating how a stack space may be allocated for a program compiled using a head-call optimization technique, according to one embodiment of the invention. In the example program listed in Table I, no information local to the get_answer( )function is used by the prompt( )function. Similarly, the prompt( )function does not return any information needed by the get_answer function. That is, no variables are passed or returned between these two functions. In one embodiment, a compiler application may be configured to recognize this pattern as a head-call and further to optimize such a pattern to move the head-call outside of the nested function. In one embodiment, the compiler may perform the head-call optimization by evaluating and modifying an intermediate representation of program source code generated during program compilation. Nevertheless, to facilitate understating of the present invention, Table II below illustrates an example of the head-call optimization technique via a modification to the source code listed in Table I.

TABLE II

Example Program After Head-call Optimization

```
01    #define ENGLISH 0
02    #define FRENCH 1
03    int language;
04    int get_answer( );
05    void prompt( );
06    int get_answer( ) {
07        int result;
08            scanf("%d", &result);
09            return result;
10    }
11    void prompt( ) {
12        char * prompts[ ] = {
13            "Give me a number!\n",
14            "Numero s'il-vous-plait!\n"
15        }
16    printf("%s", prompts[language]);
17    }
18    int main(int argc, char * argv[ ]) {
19        int answer;
20        language = FRENCH;
21        prompt( );
22        answer = get_answer( );
23        printf("The answer is %d.\n", answer);
24        return 0;
25    }
```

Illustratively, the head-call optimization results in the call to the prompt( ) function (included in the body of the get_answer( ) function in Table I) to be moved to the body of the main( ) function (line 21) in Table II. FIG. 4 illustrates a program flow 400 corresponding to the execution of the program listing in Table II. As shown, program flow 400 begins with a call to the main( ) function 410. In turn, the main( ) function 410 calls the prompt( ) function 420 directly at line 21. A stack space 430 illustrates a stack structure that results from executing this optimized program code. As shown, the stack space 430 includes an entry 440 storing data for the main( ) function and an entry 450 storing data for the prompt( ) function. Note, the stack space 430 includes only two entries. Once the prompt( ) function 420 completes executing, the entry 450 for the prompt( ) function is popped from the stack space 430, leaving only the entry 440 for the main( ) function.

Thereafter, program execution returns to line 22 (the next line of code after the prompt( ) function). As shown in a program flow 455, the main( ) function 410, then calls the get_answer( ) function 470. A stack space 480 shows the resulting stack state that occurs during the execution of program flow 455. Illustratively, stack space 480 contains the entry 440 for the main( ) function and an entry 495 for the get_answer( ) function. Once the get_answer( ) function 470 completes executing, the entry 495 for the get_answer( ) function is popped from the stack space 480, leaving only the entry 440 for the main( ) function. Thereafter, program execution returns to line 23 (the next line of code after the call to the get_answer( ) function).

Because the prompt( ) function is conceptually an element of the get_answer( ) function, a developer is unlikely to write the source code as shown in Table II. By using the head-call optimization techniques disclosed herein, the resulting machine code allows the program to use less stack space, as demonstrated by comparing the stack space 340 of FIG. 3 (having three stack space entries) with the stack space 430 and the stack space 480 of FIG. 4 (each having two entries). Thus, less memory is used to execute this program represented by the source code listing in Table II.

Figure 5:
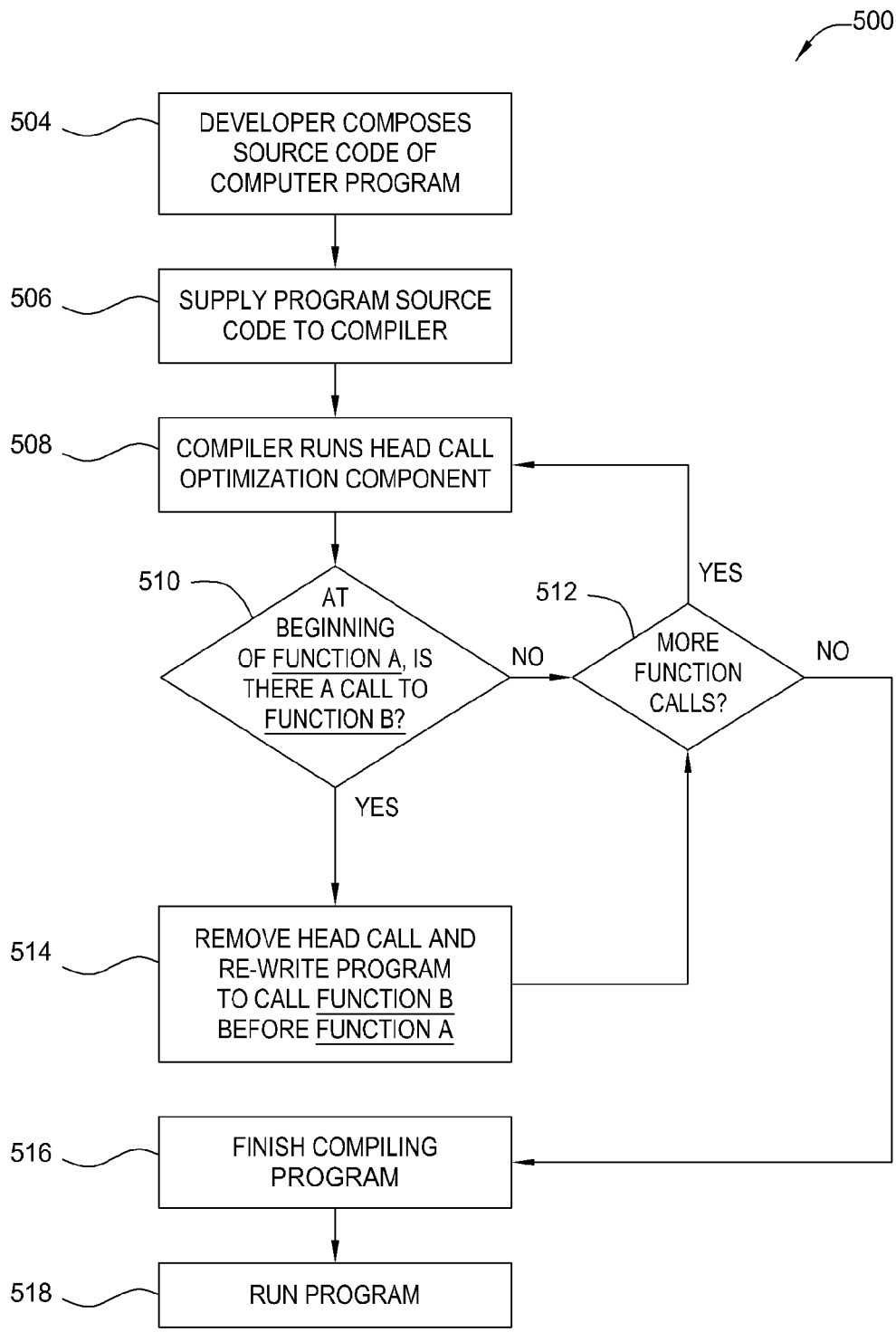
FIG. 5 is a flow diagram illustrating a method for reducing stack space consumption via head-call optimization, according to one embodiment of the invention.

FIG. 5 is a flow diagram illustrating a method 500 for reducing stack space consumption via head-call optimization, according to one embodiment of the invention. As shown, the method 500 begins at step 504, where a program developer composes the source code of a computer program. Once completed, at step 506, the program source code composed at step 504 may be supplied to a compiler application configured to perform a head-call optimization technique during program compilation. For example, the compiler application may be configured as a multi-pass compiler, first generating an intermediate representation of the source code. At step 508, once the intermediate representation is generated, a head-call optimization component may evaluate the intermediate representation to identify patterns to which a head-call optimization may be applied.

At step 510, the head-call optimization component may evaluate a given function call to determine whether it matches a head-call pattern. That is, the head-call optimization component may evaluate whether the first operation within the function is itself a call to another function where no information local to the calling function is used by the called function and where no information returned (or potentially modified) by the called function is used by the calling function. If so, then at step 514, program flow may be modified to remove the head-call (as reflected by the intermediate representation of the program generated by the compiler).

After evaluating a given function, at step 512, the head-call optimization component may determine whether additional function calls remain to be evaluated (and potentially optimized) within the intermediate representation of the computer program being compiled. If so, then the method 500 returns to step 510, where the head-call optimization component evaluates another function within the program being compiled to determine whether a head-call pattern is present. Otherwise, if there are no more function calls, then the method 500 proceeds to step 516, where the compiler completes compiling the program (e.g., performing any other optimization techniques and ultimately, outputting a sequence of machine instructions). At step 518, the compiled program may be executed.

Advantageously, embodiments provide a method for using a compiler to optimize program code by removing head-calls from functions. The optimized object code produced by a compiler may require less stack space during program execution. Thus, less memory is needed to run the program. This may be particularly useful for devices with relatively scarce memory resources, such as cell phones, PDAs, video game systems, etc.

While the foregoing is directed to embodiments of the present invention, other and further embodiments of the invention may be devised without departing from the basic scope thereof, and the scope thereof is determined by the claims that follow.

What is claimed is:

1. A method for compiling program source code, comprising:
   receiving the program source code for a software application to be compiled; and
   during program compilation, performing a head-call optimization that comprises:
      evaluating one or more function calls included in the program source code to identify whether a first operation of a first function call of the one or more function calls is to invoke a second function call of the one or more function calls,
      determining that the second function call does not return a value used by the first function call,
      determining that the second function call is not passed a parameter value local to the first function call, and then
      modifying a program flow of the computer program such that the second function call is invoked prior to an invocation of the first function call.

2. The method of claim 1, further comprising, prior to performing the head-call optimization, generating, from the program source code, an intermediate representation of the source code, and wherein the head-call optimization is used to optimize the intermediate representation.

3. The method of claim 1, wherein the step of evaluating one or more function calls included in the program source code to identify whether a first operation of a first function call is to invoke a second function call comprises:
   determining that the first function call initializes one or more local variables prior to invoking the second function call, and
   deferring initialization of the one or more local variables.

4. The method of claim 1, wherein the step of evaluating one or more function calls included in the program source code to identify whether the first operation of the first function call is to invoke the second function call comprises performing a stack splitting optimization to place on a stack local variables in the first function call needed by the second function call.

5. A computer-readable storage medium containing a compiler program, which, when executed performs an operation for compiling program source code, the operation comprising:
   receiving the program source code for a software application to be compiled; and
   during program compilation, performing a head-call optimization that comprises:
      evaluating one or more function calls included in the program source code to identify whether a first operation of a first function call of the one or more function calls is to invoke a second function call of the one or more function calls,
      determining that the second function call does not return a value used by the first function call,
      determining that the second function call is not passed a parameter value local to the first function call, and then
      modifying a program flow of the computer program such that the second function call is invoked prior to an invocation of the first function call.

6. The computer-readable storage medium of claim 5, wherein the operation further comprises, prior to performing the head-call optimization, generating, from the program source code, an intermediate representation of the source code, and wherein the head-call optimization is used to optimize the intermediate representation.

7. The computer-readable storage medium of claim 5, wherein the step of evaluating one or more function calls included in the program source code to identify whether a first operation of a first function call is to invoke a second function call comprises:
   determining that the first function call initializes one or more local variables prior to invoking the second function call, and
   deferring initialization of the one or more local variables.

8. The computer-readable storage medium of claim 5, wherein the step of evaluating one or more function calls included in the program source code to identify whether the first operation of the first function call is to invoke the second function call comprises performing a stack splitting optimization to place on a stack local variables in the first function call needed by the second function call.

9. A system, comprising:
   a processor; and
   a memory containing a compiler program, which, when executed by the processor, is configured to perform an operation for compiling program source code, of the operation comprising:
      receiving the program source code for a software application to be compiled, and
      during program compilation, performing a head-call optimization that comprises:
         evaluating one or more function calls included in the program source code to identify whether a first operation of a first function call of the one or more function calls is to invoke a second function call of the one or more function calls,
         determining that the second function call does not return a value used by the first function call,
         determining that the second function call is not passed a parameter value local to the first function call, and then
         modifying a program flow of the computer program such that the second function call is invoked prior to an invocation of the first function call.

10. The system of claim 9, wherein the operation further comprises, prior to performing the head-call optimization, generating, from the program source code, an intermediate representation of the source code, and wherein the head-call optimization is used to optimize the intermediate representation.

11. The system of claim 9, wherein the step of evaluating one or more function calls included in the program source code to identify whether a first operation of a first function call is to invoke a second function call comprises:
   determining that the first function call initializes one or more local variables prior to invoking the second function call, and
   deferring initialization of the one or more local variables.

12. The system of claim 9, wherein the step of evaluating one or more function calls included in the program source code to identify whether the first operation of the first function call is to invoke the second function call comprises performing a stack splitting optimization to place on a stack local variables in the first function call needed by the second function call.

* * * * *